Jan. 11, 1966   H. H. L. RITZ   3,228,853
FUEL ELEMENTS FOR NUCLEAR REACTORS
Filed May 7, 1962                                   5 Sheets-Sheet 4
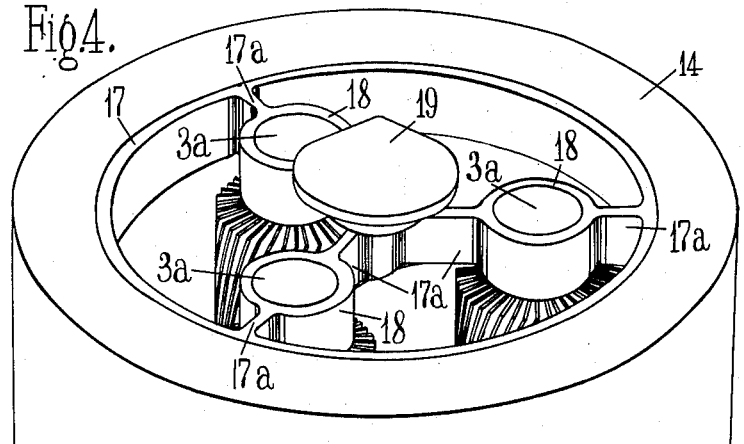
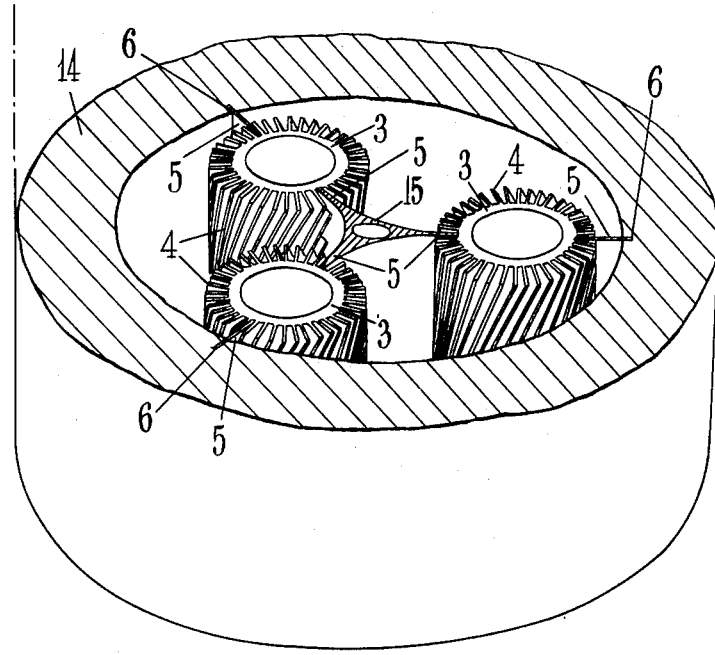

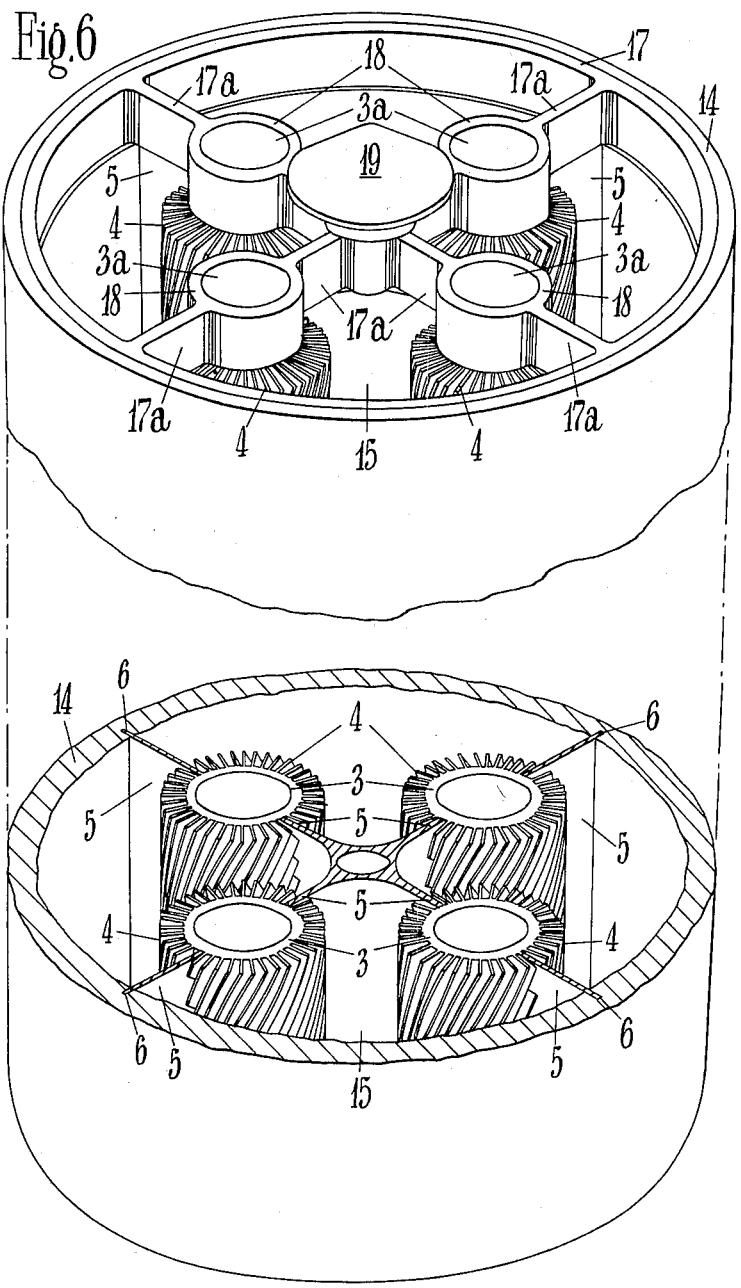

3,228,853
FUEL ELEMENTS FOR NUCLEAR REACTORS
Hugo Heinrich Ludolf Ritz, Newcastle-Upon-Tyne, England, assignor to C. A. Parsons & Company Limited, Newcastle-Upon-Tyne, England
Filed May 7, 1962, Ser. No. 192,631
Claims priority, application Great Britain, May 21, 1957, 16,137
2 Claims. (Cl. 176—78)

This application is a continuation-in-part of my prior filed application, S.N. 736,561, filed May 20, 1958, entitled "Heat Exchange Elements for Nuclear Reactors" and now Patent No. 3,116,213 dated December 31, 1963.

This invention relates to fuel elements for nuclear reactors and is concerned with fuel elements of the kind in which nuclear fuel is housed in closed containers over the surface of which a cooling fluid is directed.

It is usual to form fins on the surface of such containers to improve heat transfer and in U.S. application Serial No. 618,258, filed October 25, 1956 for Heat Transfer Between a Surface and a Liquid, there is described a fuel element having fins helically disposed about its longitudinal axis and longitudinal baffles arranged around the periphery of the element which baffle the flow channels formed between the fins. When such a fuel element is placed in a bore in a moderator core of a reactor the baffles extend in the radial direction to a position close to the wall of the bore. The effect of this is that an annular space between the surface of the fuel element and the wall of the bore through which the cooling fluid flows is divided up into a number of separate arcuate zones and the gas tends to follow a helical path in each zone with a superimposed flow effect produced by contact with the fins. This considerably increased the heat transfer.

The heat transfer can also be improved by making the cross-section of the fuel a minimum and this leads to arrangements wherein a fuel element comprises several fuel containers, the several fuel containers having their axes substantially parallel and parallel to the axis of the bore. An arrangement such as this was described in U.S. application Serial No. 736,561, filed May 20, 1958 for Heat Exchange Elements Suitable for Use as Fuel Elements for Nuclear Reactors. In this latter application, an arrangement was described in which the fuel element comprised several fuel containers each having helically finned surfaces and these containers were arranged in an enclosing tube the containers being located at the ends of radial arms extending from a central support member. In this arrangement cooling fluid could circulate around each container in turn and a flow pattern the same as or similar to that produced with a single element according to the above mentioned application, Serial No. 618,258 was achieved.

The object of the present invention is to provide a fuel element in accordance with the said application Serial No. 736,561 but in which the construction is modified to improve the circulation of cooling fluid flowing thereover with a view of increasing the heat transfer from the element.

The invention consists in a fuel element for a nuclear reactor which element comprises a plurality of tubular containers housing nuclear fuel located in an enclosing tube or bore in a reactor core, said containers having their longitudinal axes substantially parallel to one another and to the axis of the enclosing tube or bore and the outer surface of each container having fins thereon which are helically disposed with respect to the longitudinal axes of the container, and baffles extending in the direction of the longitudinal axes of the containers, intersecting the fins on said containers to baffle the flow between the fins at the points of intersection, said baffles extending between the containers and between the containers and the wall of the enclosing tube or bore to provide a plurality of separate flow channels through the bore or enclosing tube.

The invention also consists in fuel elements for a nuclear reactor substantially as described below with reference to the accompanying drawings.

Referring to the aforesaid drawings:

FIGURE 4 is a perspective view, partly cut away, of the arrangement of FIGURE 3;

FIGURE 6 is a perspective view, partly cut away, of the arrangement of FIGURE 5.

Figure 1:
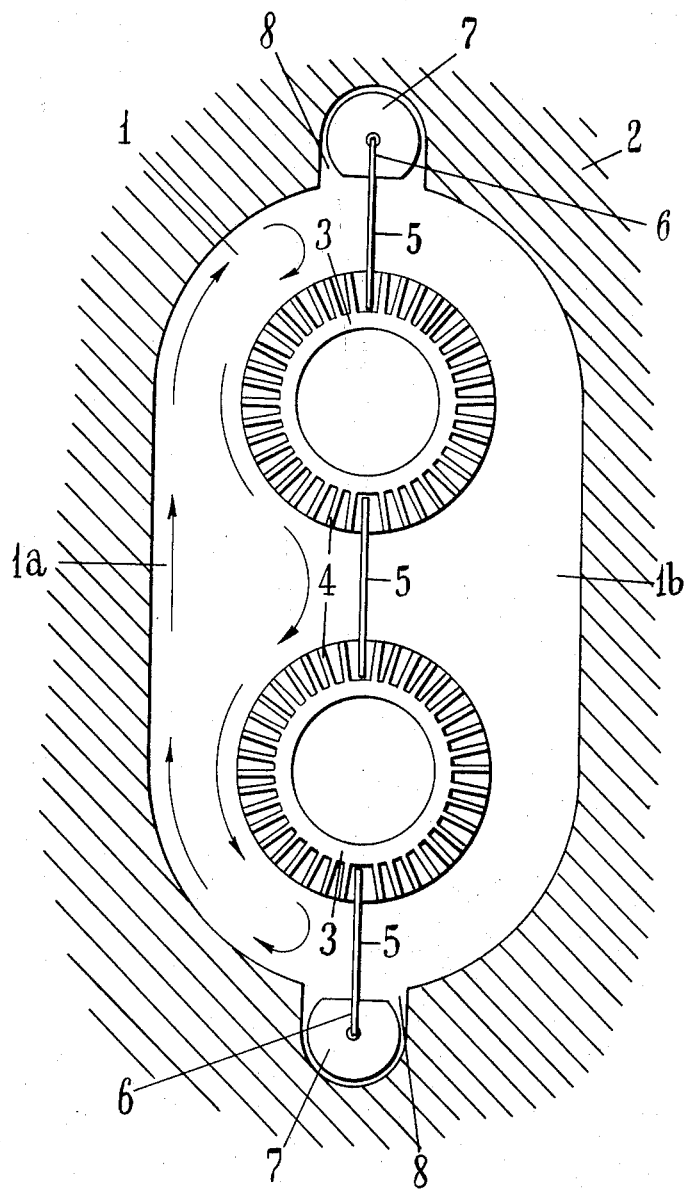
FIGURE 1 is a cross-section through a bore in a reactor core showing a fuel element comprising two tubular fuel containers arranged in accordance with one form of the present invention.
Figure 2:
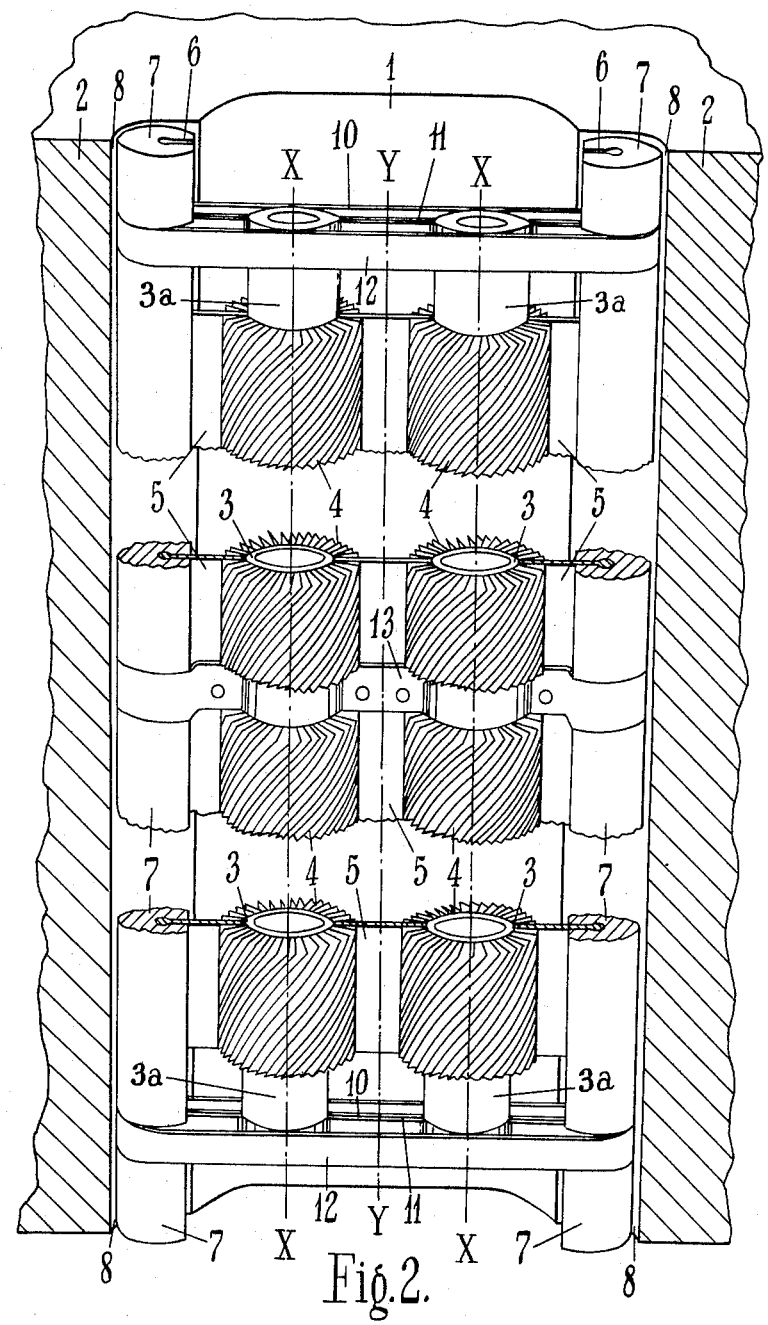
FIGURE 2 is a perspective view partly cut away of the arrangement illustrated in FIGURE 1.

In carrying the invention into effect in the forms illustrated by way of example and referring to FIGURES 1 and 2, a bore 1 in a reactor core 2 of a nuclear reactor contains a fuel element in the form of two tubular fuel containers 3 arranged with their axes XX substantially parallel to each other and to the longitudinal axis YY of the bore. The outer surfaces of the containers have fins 4 formed thereon which are helically disposed with respect to the longitudinal axes XX of the containers. The bore is divided into two separate channels 1a, 1b for cooling fluid by baffles 5 which intersect the fins 4 on each container 3 and baffle the flow of fluid between the fins 4 at the places of intersection. The baffles 5 extend between the containers 3 and also between the containers 3 and the wall of the bore 1. In the particular form shown in FIGURES 1 and 2 by way of example the baffles 5 enters slots 6 formed in pillars 7 at each side of the bore 1. Each pillar is located in a recess 8 formed in the core 2. The use of pillars is not essential to the invention and the baffles, if so desired, may enter slots formed in the core.

The end fixing arrangement shown in FIGURES 1 and 2 is likewise one of many forms that may be adapted. The ends of the fuel containers 3 are held between two straps 10, 11 which pass around the pillars 7. The straps 10, 11 are enclosed in a strap 12 which passes around the pillars 7 and is tangential to the end portions 3a (FIG. 2) of the fuel containers 3.

For added stability an additional strap 13 may be located intermediate the ends of the containers and this passes around the pillar 7 and is rivetted or spot welded to the baffles 5 and to the fuel containers 3. This additional strap is not an essential feature.

The arrangement of two containers in the way described produces vortices on each side of the baffles as indicated by the arrows in FIGURE 1. These vortices are produced by the helical fins on the fuel container and are assisted by the walls of the bore and the baffles. The fact that the baffles 5 extend to the wall of the bore 1 means that two distinct channels 1a, 1b are formed, parts of the periphery of which are formed by the fins of the two fuel containers, and vortex motion is maintained over substantially the whole length of the containers. This results in an improvement in heat transfer over arrangements in which the cooling fluid can circulate in a continuous pattern around all the fuel containers in a given bore. In addition the containers are given additional support by the baffles which extend to the wall of the bore. Several such groups of two containers may be arranged one above the other in a given bore in the reactor core.

Figure 3:
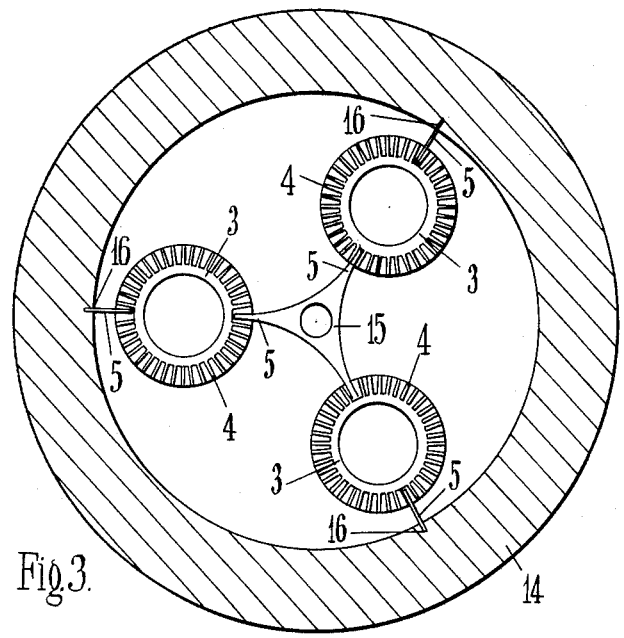
FIGURE 3 is cross-section through an enclosing tube housing a fuel element comprising three tubular fuel containers arranged in accordance with a second form of the present invention.

In the arrangement of FIGURES 3 and 4 the fuel element comprises three fuel containers 3 which are located in an enclosing tube 14 which may, for example, be of graphite. The baffles 5 extend to the inner wall of the tube 14 and emanate from a central support member 15. The baffles fit into slots 16 formed in the tube.

To support the containers in the tube an end ring 17 may be used which has radial arms 17a having further rings 18 which fit over the ends 3a of the containers 3 and may be brazed thereto. Several such fuel elements may be located in a given bore in the reactor core and the tube be supported at the lower end of the bore if it were vertical.

A cone shaped member 19 is fitted to the end ring 17 and, when the tube 14 is in position in the bore, it fits into a member fitted to the central support member 15 on the tube above having a conical shaped recess to locate the fuel elements in the axial direction.

In the arrangement of FIGURES 3 and 4 the flow channel for cooling fluid inside the tube 14 is divided into three distinct channels part of the periphery of each separate channel being formed by the helical fins of adjacent fuel containers and a vortex type of flow is formed in each separate channel. The use of a fuel element with three tubular containers arranged as shown means that the cross-section of the nuclear fuel is smaller than with the two container type shown in FIGURES 1 and 2 and this leads to improved heat removal over the arrangement of FIGURES 1 and 2, but the fuel itself is dispersed to a greater extent in the flow channel and this leads to reduced reactivity. As a consequence it may be necessary to use a slightly enriched uranium as opposed to the use of natural uranium as is possible with the arrangement of FIGURES 1 and 2.

Figure 5:
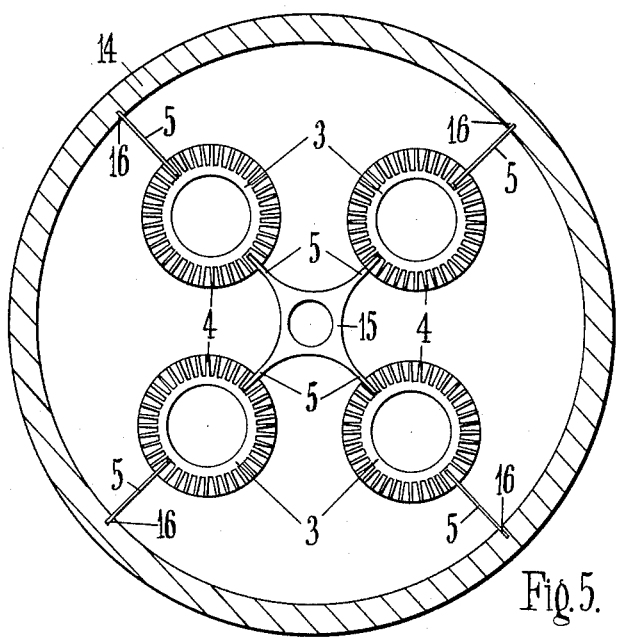
FIGURE 5 is a cross-section through an enclosing tube housing a fuel element comprising four tubular fuel containers arranged in accordance with a third form of the present invention.

The fuel element of FIGURES 5 and 6 also uses an enclosing tube but this time four tubular fuel containers 3 are used and the flow channel is divided into four separate channels. This enables a further reduction in the cross-section of the fuel to be obtained but the dispersion of the fuel is further increased and in this particular case it may be necessary to use say enriched uranium as opposed to natural uranium as the fuel.

As in the case of the other forms of fuel described above the fuel element of FIGURES 5 and 6 may also be stacked with others in the bore of the reactor core. The enclosing tube 14 may be of graphite.

Whilst the forms illustrated in FIGURES 3–6 show enclosing tubes for the fuel element these are not essential.

The fins are shown in all the figures as being disposed helically in the same direction, but this, whilst preferable, is not essential to the invention.

I claim:

1. A fuel element for a nuclear reactor including an enclosing member having an internal wall and which element comprises a plurality of tubular containers housing nuclear fuel located in the bore of said enclosing member, said containers having their longitudinal axes substantially parallel to one another and to the axis of the enclosing member and the outer surface of each container having fins thereon which are helically disposed with respect to the longitudinal axes of the contaner, baffles extending in the direction of the longitudinal axes of the containers, intersecting the fins on said containers to baffle the flow between the fins at the points of intersection and, said baffles extending between the respective containers and between each container and the internal wall of the enclosing member to provide a plurality of separate flow channels through the enclosing member.

2. A fuel element as claimed in claim 1 and in which each longitudinal baffle extending between a container and the internal wall has a radial extent in excess of the distance between the periphery of the associated fins and the internal wall of the enclosing member, said internal wall having socket means associated therewith accommodating the outer end of each of the afore-mentioned longitudinal baffles and each separate flow channel extending around part of the periphery of two adjacent containers.

References Cited by the Examiner

UNITED STATES PATENTS

| 2,898,280 | 8/1959 | Schultz | 176—81 |
| 2,902,422 | 9/1959 | Hutter | 176—81 |
| 3,030,292 | 4/1962 | Ritz | 176—83 |
| 3,116,213 | 12/1963 | Ritz | 176—64 |

FOREIGN PATENTS

| 1,197,912 | 6/1959 | France. |
| 847,220 | 9/1960 | Great Britain. |

OTHER REFERENCES

Nucleonics, vol. 13, No. 6, June 1955, page 93.

CARL D. QUARFORTH, *Primary Examiner.*